United States Patent
Wagle et al.

(10) Patent No.: US 10,227,007 B1
(45) Date of Patent: Mar. 12, 2019

(54) SEAMLESSLY INTEGRATED INSTRUMENT PANEL DISPLAY

(71) Applicant: N.S. International, LTD, Troy, MI (US)

(72) Inventors: Saumil Wagle, Dearborn, MI (US); Diyu Chen, Madison Heights, MI (US); Arul Krishna, Farmington Hills, MI (US)

(73) Assignee: N.S. International, Ltd., Troy, MI (US)

( * ) Notice: Subject to any disclaimer, the term of this patent is extended or adjusted under 35 U.S.C. 154(b) by 0 days.

(21) Appl. No.: 15/956,436

(22) Filed: Apr. 18, 2018

(51) Int. Cl.
*B60K 37/02* (2006.01)
*G01D 11/28* (2006.01)

(52) U.S. Cl.
CPC .............. *B60K 37/02* (2013.01); *G01D 11/28* (2013.01); *B60K 2350/203* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,246,935 B1 * | 6/2001 | Buckley | ................. | B60K 35/00 340/425.5 |
| 6,603,393 B2 * | 8/2003 | Sumada | ................. | B60K 37/02 340/425.5 |
| 7,212,107 B2 * | 5/2007 | Nakazawa | ............. | G01C 22/02 340/425.5 |
| 7,382,234 B2 * | 6/2008 | Yokota | ................... | B60K 35/00 340/425.5 |
| 7,382,237 B2 * | 6/2008 | Stoschek | ................ | B60K 35/00 340/425.5 |
| 8,816,833 B2 * | 8/2014 | Tominaga | .............. | B60K 35/00 116/287 |
| 8,830,043 B2 * | 9/2014 | Sato | ....................... | B60K 37/02 340/425.5 |
| 2004/0135678 A1 * | 7/2004 | Sugimoto | ............. | B60K 37/02 340/425.5 |
| 2004/0189446 A1 * | 9/2004 | Fournier | ................ | B60K 37/02 340/425.5 |
| 2006/0092001 A1 * | 5/2006 | Yokota | ................... | B60K 35/00 340/425.5 |
| 2009/0174533 A1 * | 7/2009 | Bowden | ................. | B60K 37/02 340/425.5 |
| 2010/0033311 A1 * | 2/2010 | Tominaga | .............. | B60K 35/00 340/425.5 |
| 2010/0164698 A1 * | 7/2010 | Tsubooka | ............... | B60K 35/00 340/425.5 |

(Continued)

*Primary Examiner* — Lisa Lea-Edmonds
(74) *Attorney, Agent, or Firm* — Butzel Long, PC; Gunther J. Evanina

(57) ABSTRACT

A composite instrument panel having both an electronic display and an opaque dial plate is provided with features that mimic a seamless electronic display. The instant panel includes an electronic display and an applique having a translucent or transparent window through which the electronic display is viewable, and an opaque area adjacent the window defining a dial plate upon which indicia can be printed, the transparent or translucent window having a peripheral border area that transitions from transparent or translucent at an inner edge of the border nearer a center of the window to opaque or nearly opaque at an outer edge of the border farther from the center of the window.

11 Claims, 3 Drawing Sheets

FIG. 6

(56) References Cited

U.S. PATENT DOCUMENTS

| | | | |
|---|---|---|---|
| 2010/0245580 A1* | 9/2010 | Masui | B60K 35/00 348/148 |
| 2012/0306635 A1* | 12/2012 | Sato | B60K 37/02 340/425.5 |
| 2013/0176118 A1* | 7/2013 | Nagara | B60K 37/02 340/425.5 |
| 2013/0293364 A1* | 11/2013 | Ricci | B60K 35/00 340/425.5 |

\* cited by examiner

SEAMLESSLY INTEGRATED INSTRUMENT PANEL DISPLAY

FIELD OF THE DISCLOSURE

This disclosure relates to instrument displays, and more particularly to vehicle instrument panels.

BACKGROUND OF THE DISCLOSURE

Conventional instrument panel clusters are often comprised of a composite of at least one electronic display and at least one analog display. Such instrument clusters typically have well defined edges separating the electronic display from the analog display. A typical conventional cluster 100 is shown in FIG. 1. Cluster 100 includes an electronic display 110 disposed on a circuit board 112, and an overlaying applique 114 having an opening 116 to allow viewing of the electronic display. The gloss and appearance between the applique or dial plate and electronic display is very different, such that the edges of the opening in the applique create a picture frame effect. There is also a height difference between the applique and the electronic display that creates a visually perceptible depth difference between the display image and the dial plate.

Many automobile purchasers and manufacturers are demanding a more seamless appearance and large display look, wherein the entire instrument panel cluster appears to be a single electronic display. Attempts to achieve a seamless appearance have generally involved provision of a neutral density filter window (e.g., smoke printed window) within the opening 116. However, such attempts disadvantageously reduce display intensity and do not alter the perceived depth difference between the electronic display and the dial plate. Further, the filter only hides the opening when the display is off. When the display is lit, a grayish appearance in the lit area creates a noticeable contrast and picture frame effect.

SUMMARY OF THE DISCLOSURE

In certain aspects of this disclosure, an instrument panel display comprising both an electronic display and a dial plate display has a seamless appearance that effectively conceals the interfacing edges of the electronic display and dial plate display. The dial plate is defined by an applique having a translucent or transparent window through which the electronic display is viewable, and an opaque area adjacent the window defining a dial plate upon which indicia corresponding to an instrument reading can be printed. The transparent or translucent window has a peripheral border area that transitions from transparent or translucent at an inner edge at the border nearer a center of the window to opaque or nearly opaque at an outer edge of the border farther from the center of the window. This can be achieved using a gradient printing pattern.

In certain other aspects of this disclosure, an instrument panel display comprises an electronic display, an applique having a transparent or translucent window through which the electronic display is viewable, and an optically clear material disposed and filling a space between the window and the electronic display.

In certain other aspects of this disclosure, an instrument panel display comprises an electronic display, an applique having a transparent or translucent window through which the electronic display is viewable, wherein the electronic display presents graphic images at the peripheral border that fade from bright at the inner edge of the border to faint at the outer edge of the border.

DESCRIPTION OF THE ILLUSTRATED EMBODIMENT(S)

Figure 1:
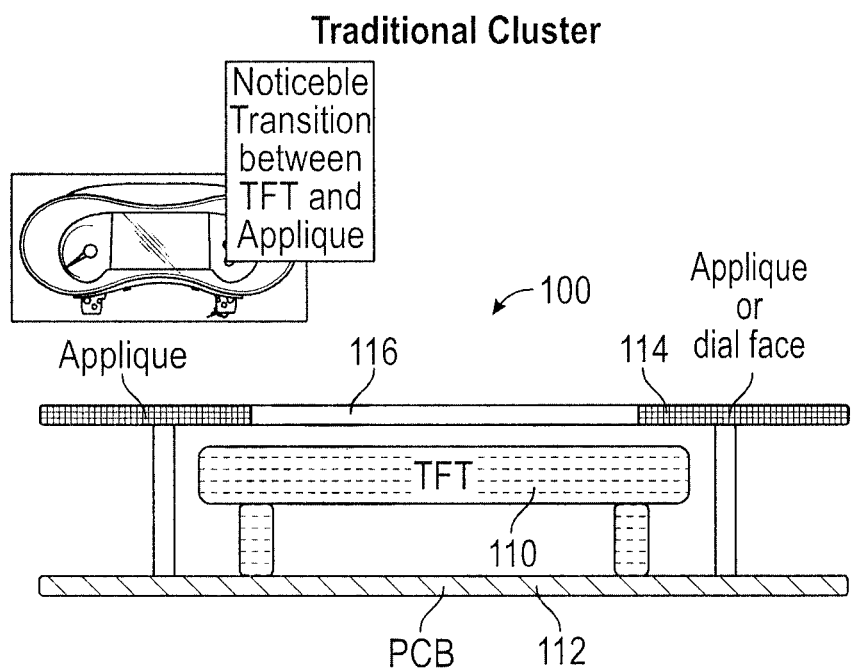
FIG. 1 is a schematic illustration of a conventional composite instrument panel display having an electronic display and an applique defining a dial plate.
Figure 2:
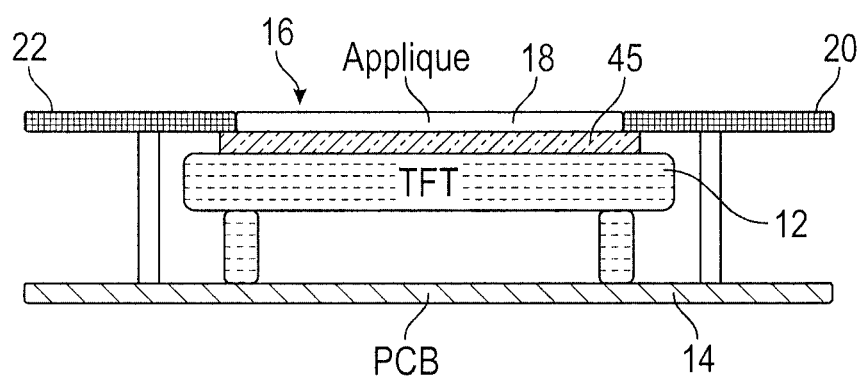
FIG. 2 is a schematic illustration of a composite instrument panel display in accordance with this disclosure.

An instrument panel display 10 in accordance with this disclosure is schematically illustrated in cross-section in FIG. 2. The display includes an electronic display device 12, such as an LED display or an LCD (e.g., thin-film-transistor liquid crystal display), which can be mounted on a printed circuit board 14, and an applique 16 having a transparent (light transmissive without image distortion) or translucent (light transmissive with slight distortion, i.e., semi-transparent) window 18 and opaque dial plate portions 20, 22. Window 18 is disposed directly over (i.e., overlies) electronic display 12 to allow graphic content on display 12 to be viewed through the applique. Indicia can be provided on dial plate portions 20, 22, such as markings used in conjunction with a pointer to indicate oil pressure, fuel gauge readings, tachometer readings, etc.

Figure 3:
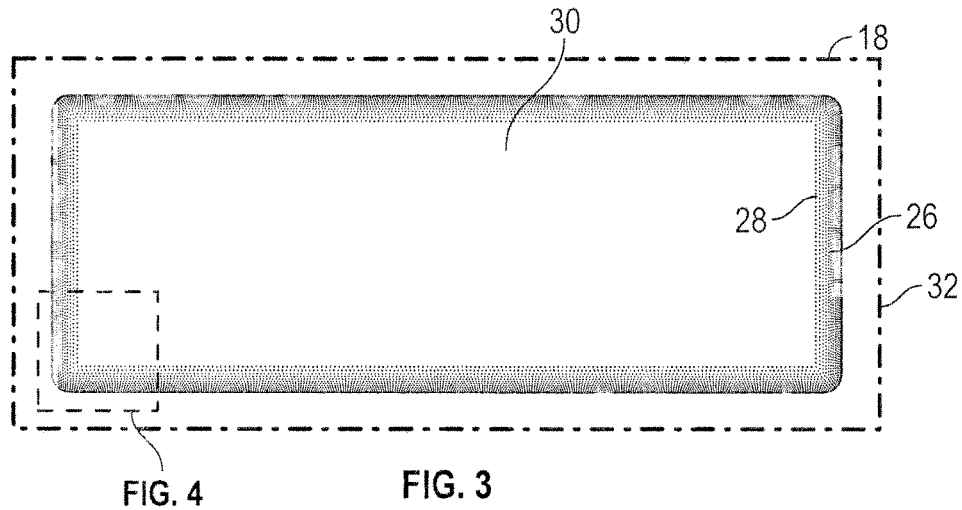
FIG. 3 is a front view of the window portion of the applique that overlies the electronic display of the composite panel display shown in FIG. 2.
Figure 4:
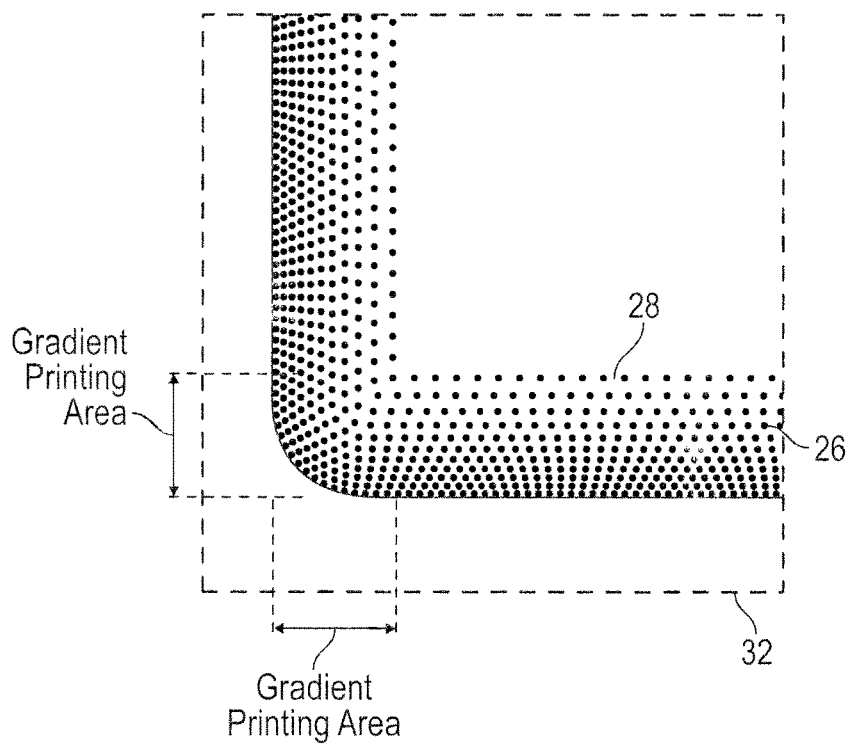
FIG. 4 is an enlarged view of a section of the window shown in FIG. 3.

As shown in FIGS. 3 and 4, window 18 includes a peripheral border 26 that transitions from transparent or translucent at an inner edge 28 of the border nearer a center 30 of the window to opaque or nearly opaque at an outer edge 32 of the border farther from the center of the window. The transition can be achieved by gradient printing of the border. Gradient printing can for example be achieved by printing a pattern of dots wherein the dots become gradually larger in a direction to transition from clear to opaque or near opaque. The gradient or transition at the border 26 helps conceal the boundary between the window 30 and the dial plates 20, 22.

Figure 5:
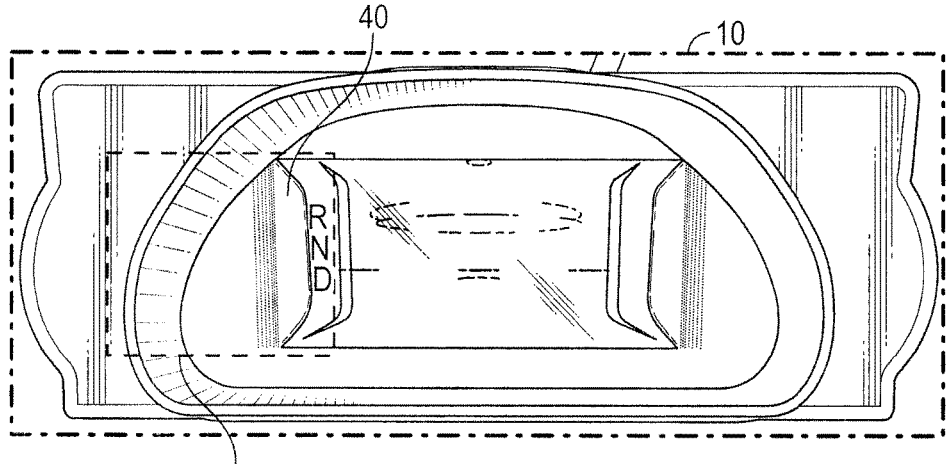
FIG. 5 is a front view of the composite instrument panel display shown in FIG. 3.
Figure 6:
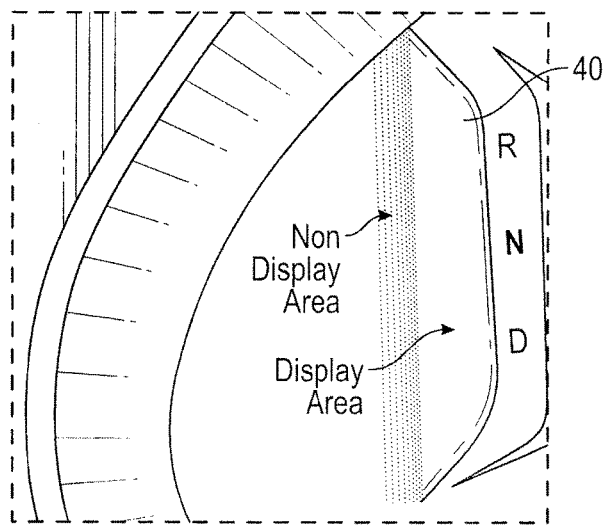
FIG. 6 is an enlarged view of a section of the display shown in FIG. 5.
Figure 7:
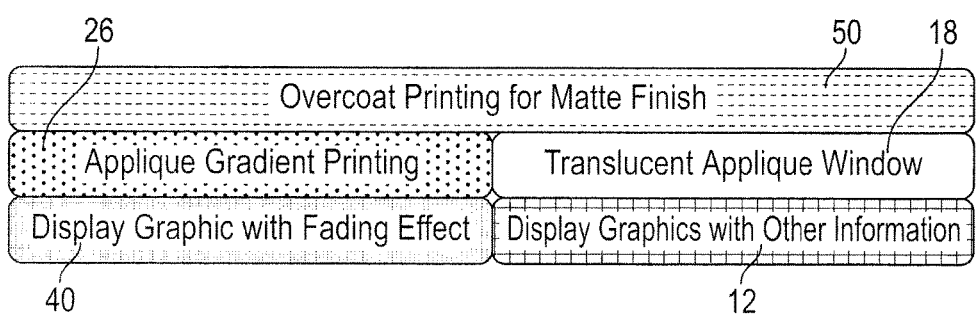
FIG. 7 is a schematic cross-section of the display shown in FIG. 6.

The electronic display can be provided with a graphics generator or processor that produces a graphic image 40 at the peripheral border of the overlying window that fades from bright at the inner edge of the border to faint (or dim) at the outer edge of the border (see FIGS. 5-7). The fading effect can overlap the gradient printing at border 26 to achieve a seamless display with the electronic display ON (powered).

With reference to FIG. 2, applique 16 can be optically bound to electronic display 12 by filling a space between window 18 and display 12 with an optically clear material 45. The image of display 12 is transposed onto the surface of applique 16 by material 45 because there is no significant change of medium (or refractive index) between the display and applique. As a consequence, display readability in sunlight is improved due to reduced reflection at the display surface, and image brightness is increased due to higher light efficiency.

FIG. 7 is a schematic cross-section of a portion of the display at the border 26 of window 18. The gradient printing at border 26 overlies the portion of the electronic display 12 providing a fade effect for graphic 40, and a matte finish overcoat 50 is applied to the surface of window 18 (including border 26) to further help achieve a full seamless display appearance. Overcoat 50 can be applied by using ink printing techniques. The diffusion level of the ink is selected to achieve minimal loss of clarity of the displayed graphics.

Accordingly, it is to be understood that the above description is intended to be illustrative and not restrictive. Many embodiments and applications other than the examples provided would be apparent upon reading the above description. The scope of the invention should be determined with reference to the appended claims along with the full scope of equivalents to which such claims are entitled. It is anticipated and intended that future developments will occur, and that the disclosed systems and methods will be incorporated into such future embodiments. In summary, it should be understood that the invention is capable of modification and variation.

What is claimed is:

1. An instrument panel display comprising:
    an electronic display; and
    an applique having a translucent or transparent window through which the electronic display is viewable, and an opaque area adjacent the window defining a dial plate upon which indicia can be printed, the transparent or translucent window having a peripheral border area that transitions from transparent or translucent at an inner edge of the border nearer a center of the window to opaque or nearly opaque at an outer edge of the border farther from the center of the window.

2. The instrument panel display of claim 1, wherein the peripheral border has gradient printing.

3. The instrument panel display of claim 1, wherein the electronic display presents graphic images at the peripheral border that fade from bright at the inner edge of the border to faint at the outer edge of the border.

4. The instrument panel display of claim 1, wherein the window of the applique is optically bonded to the underlying electronic display by an optically clear material disposed and filling a space between the window and the electronic display.

5. The instrument panel display of claim 1, further comprising a clear matte overcoat on at least the window.

6. An instrument panel display comprising:
    an electronic display;
    an applique having a transparent or translucent window through which the electronic display is viewable; and
    an optically clear material disposed and filling a space between the window and the electronic display to optically bond the window of the applique to the electronic display.

7. The instrument panel display of claim 6, further comprising a clear matte overcoat on at least the window.

8. The instrument panel display of claim 6, wherein the peripheral border has gradient printing.

9. An instrument panel display comprising:
    an electronic display;
    an applique having a transparent or translucent window through which the electronic display is viewable; and
    wherein the electronic display presents graphic images at the peripheral border that fade from bright at the inner edge of the border to faint at the outer edge of the border.

10. The instrument panel display of claim 9, wherein the window of the applique is optically bonded to the underlying electronic display by an optically clear material disposed and filling a space between the window and the electronic display.

11. The instrument panel display of claim 9, further comprising a clear matte overcoat on at least the window.

\* \* \* \* \*